UNITED STATES PATENT OFFICE.

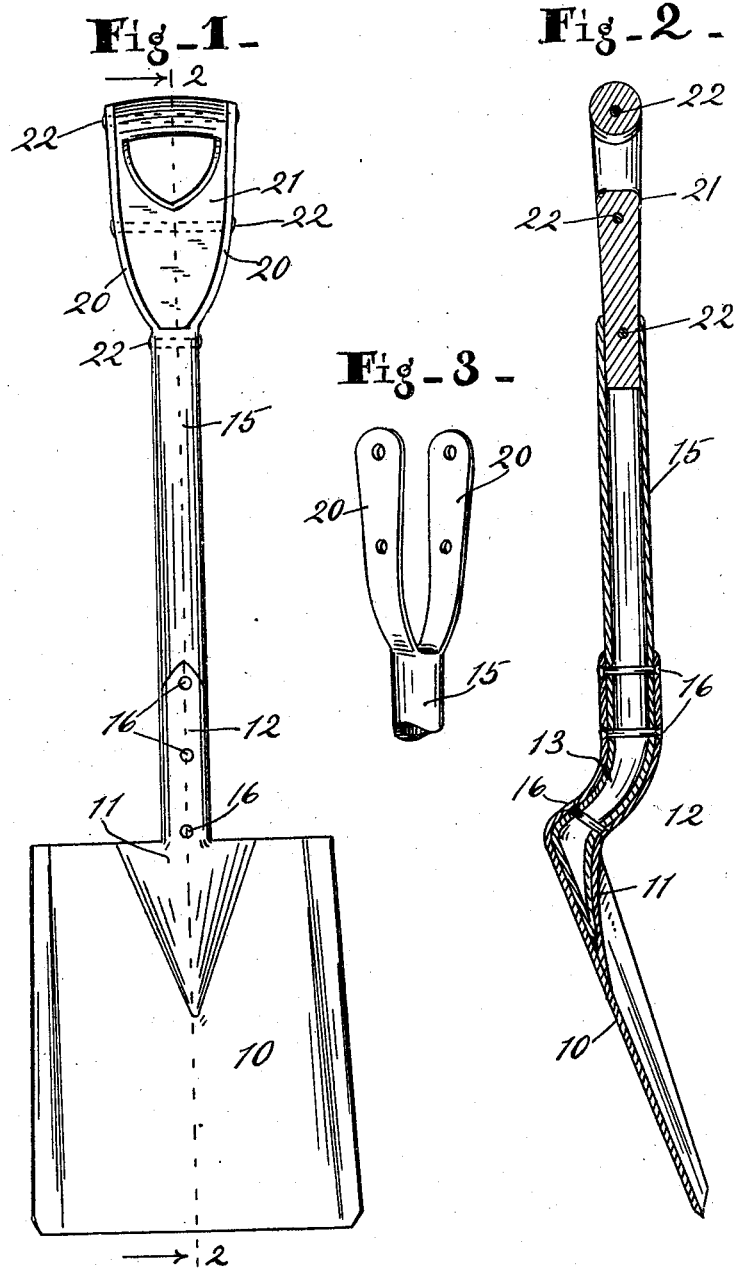

HARVEY S. URBAN, OF ANDERSON, INDIANA, ASSIGNOR OF ONE-HALF TO HENRY A. URBAN, OF ANDERSON, INDIANA.

HANDLE FOR SHOVELS AND THE LIKE.

937,894. Specification of Letters Patent. Patented Oct. 26, 1909.

Application filed July 23, 1908. Serial No. 444,956.

*To all whom it may concern:*

Be it known that I, HARVEY S. URBAN, of Anderson, county of Madison, and State of Indiana, have invented a certain new and useful Handle for Shovels and the Like; and I do hereby declare that the following is a full, clear, and exact description thereof, reference being had to the accompanying drawings, in which like numerals refer to like parts.

The object of this invention is to improve the construction of shanks and handles for shovels, spades, forks and the like whereby the same will be very strong and durable, especially at the usual points of weakness and strain.

One feature of the invention consists in forming the shank of tubular metal that has at its upper end integral projections or strips between which the D or portion grasped by the hand is secured by means of rivets or bolts extending therethrough transversely. The lower part of the D projects into the ferrule-like upper end of the tubular shank.

Another feature of the invention consists in securing the lower end of the tubular metal shank in the usual socket in the upper part of the shovel or the like and between the usual oppositely located plates or projections that extend up from the shovel and through which bolts are riveted. This combination of the metal straps or extensions from the shovel with the tubular metal shank makes an extremely strong shovel at a point where the greatest strain comes in using a shovel or the like.

While I show the invention herein in connection with a shovel, I do not wish to be construed as limiting the invention to a shovel as it may be used on other devices requiring handles.

The full nature of the invention will be understood from the accompanying drawings and the following description and claim:

In the drawings Figure 1 is an elevation of the shovel. Fig. 2 is a central longitudinal section through it. Fig. 3 is a perspective view of the upper end of the metal shank.

In the drawings herein there is shown a shovel 10 with a socket portion 11 in the upper part thereof from which upwardly extending strips or plates 12 and 13 project. These are oppositely located and into the socket thus formed and between the strips 12 and 13 the lower end of the tubular shank 15 of the handle is inserted and secured by the riveted bolts 16 that pass through said plates 12 and 13 and the tubular shank of the handle 15. It is observed that the lower part of the tubular shank 15 of the handle is shaped to conform with the inner wall of the socket portion 11 and the plates or extensions 12 and 13 so that the connection or union between the shank 15 and the parts of the shovel will be absolutely rigid and firm.

At its upper end the tubular shank 15 of the handle has two oppositely located upwardly extending strips or bars 20 between which the D-handle 21 is secured by riveted bolts 22 and by the lower end of the D-handle projecting some distance into the upper end of the shank 15, so that one bolt 22 may pass through the tubular shank 15 of the handle and the lower rounded end of the D-handle. One bolt 22 passes through the central portion of the D-handle and the adjacent strips 20, while another bolt 22 passes through the upper end of the strips 20 and the upper end of the D-handle, which is grasped by the hand. It is observed that this construction of the upper end of the handle is very strong and durable and the width of the D-handle is materially narrowed as compared with the width of wooden D-handles heretofore in general use because of the strong reinforcement on each side.

What I claim as my invention and desire to secure by Letters Patent is:

A handle consisting of a main tubular portion with a pair of oppositely located bars extending from one end thereof, a D-handle between said bars with the lower end thereof projecting into the tubular portion of the handle, and bolts extending through upper and lower ends and middle portion of the D-handle and the adjacent parts for securing them together.

In witness whereof, I have hereunto affixed my signature in the presence of the witnesses herein named.

HARVEY S. URBAN.

Witnesses:
WINFIELD W. DURBIN,
GEORGIE W. WELLS.